Oct. 18, 1955     W. J. BLOOMFIELD     2,720,663
LATCH FOR RELEASE OF RETRIEVING GEAR

Filed April 8, 1952     2 Sheets-Sheet 1

INVENTOR
WILLIAM J. BLOOMFIELD

BY D. C. Dryer
Joseph Weingarten
ATTORNEYS

Oct. 18, 1955   W. J. BLOOMFIELD   2,720,663
LATCH FOR RELEASE OF RETRIEVING GEAR
Filed April 8, 1952   2 Sheets-Sheet 2
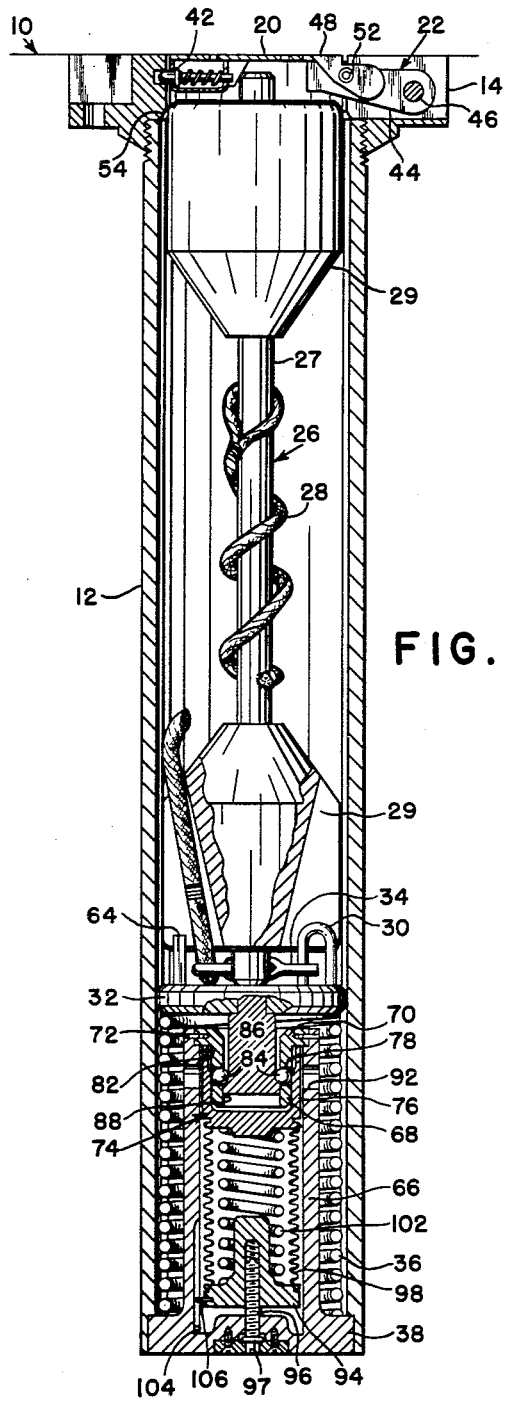
FIG. 2
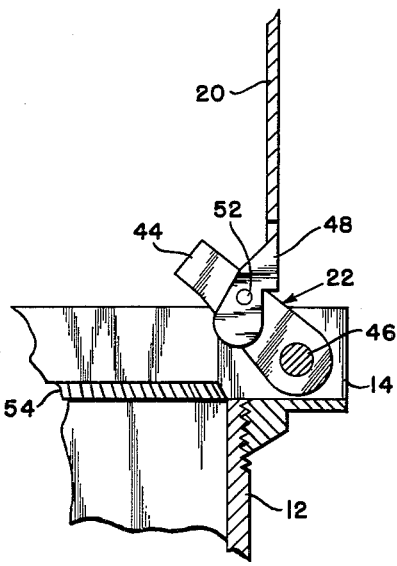
FIG. 2A
FIG. 2B
INVENTOR
WILLIAM J. BLOOMFIELD
BY
ATTORNEYS United States Patent Office 2,720,663
Patented Oct. 18, 1955

2,720,663

LATCH FOR RELEASE OF RETRIEVING GEAR

William J. Bloomfield, Middletown, R. I.

Application April 8, 1952, Serial No. 281,251

6 Claims. (Cl. 9—9)

(Granted under Title 35, U. S. Code (1952), sec. 266)

This invention relates to retrieving gear and more particularly to retrieving gear suitable for recovery of submerged marine vessels and pressure operated latches therefor. Considerable difficulty is usually encountered in locating marine vessels that have submerged in unknown locations. For example, torpedoes are frequently tested by replacing the war head by a dummy head and firing the torpedoes over a test range. In certain instances devices are provided for causing the torpedo to surface at the end of the trial run. However, such devices may malfunction and the torpedo may submerge in a location that is not precisely known. Further difficulty will be encountered in locating the submerged torpedo if the steering or driving mechanism has also malfunctioned so that the exact position of the submerged torpedo cannot be accurately predicted. Similar difficulties are encountered in locating boats, submarines or other vessels that for one cause or another become submerged in locations that are not precisely known.

Therefore, it is an object of the present invention to provide suitable retrieving gear for submerged marine vessels.

A further object of the present invention is to provide retrieving gear that will not interfere with the normal operation of the vessel or object in which it is installed.

Still another object of the present invention is to provide retrieving gear that will operate automatically on the submergence of the vessel below a predetermined depth.

A somewhat broader object of the present invention is to provide retrieving gear that will operate automatically in response to a preselected change in pressure to which it is subjected.

Still another object of the invention is to provide a novel latch suitable for use in retrieving gear. Other objects, features and advantages of the invention will become apparent as the description of the invention proceeds.

For a better understanding of the invention reference should be had to the following detailed description which is to be read in conjunction with the accompanying drawings in which:

Fig. 2 is a cross-sectional view of a preferred embodiment of the present invention taken along the lines II—II of Fig. 1;

Fig. 2A is an end elevation of the float member of Fig. 2;

Fig. 2B is a detailed view of a hinge member of Fig. 2 shown in a partially open position.

Throughout the drawings like reference numerals designate the same part.

Figures 1, 3:
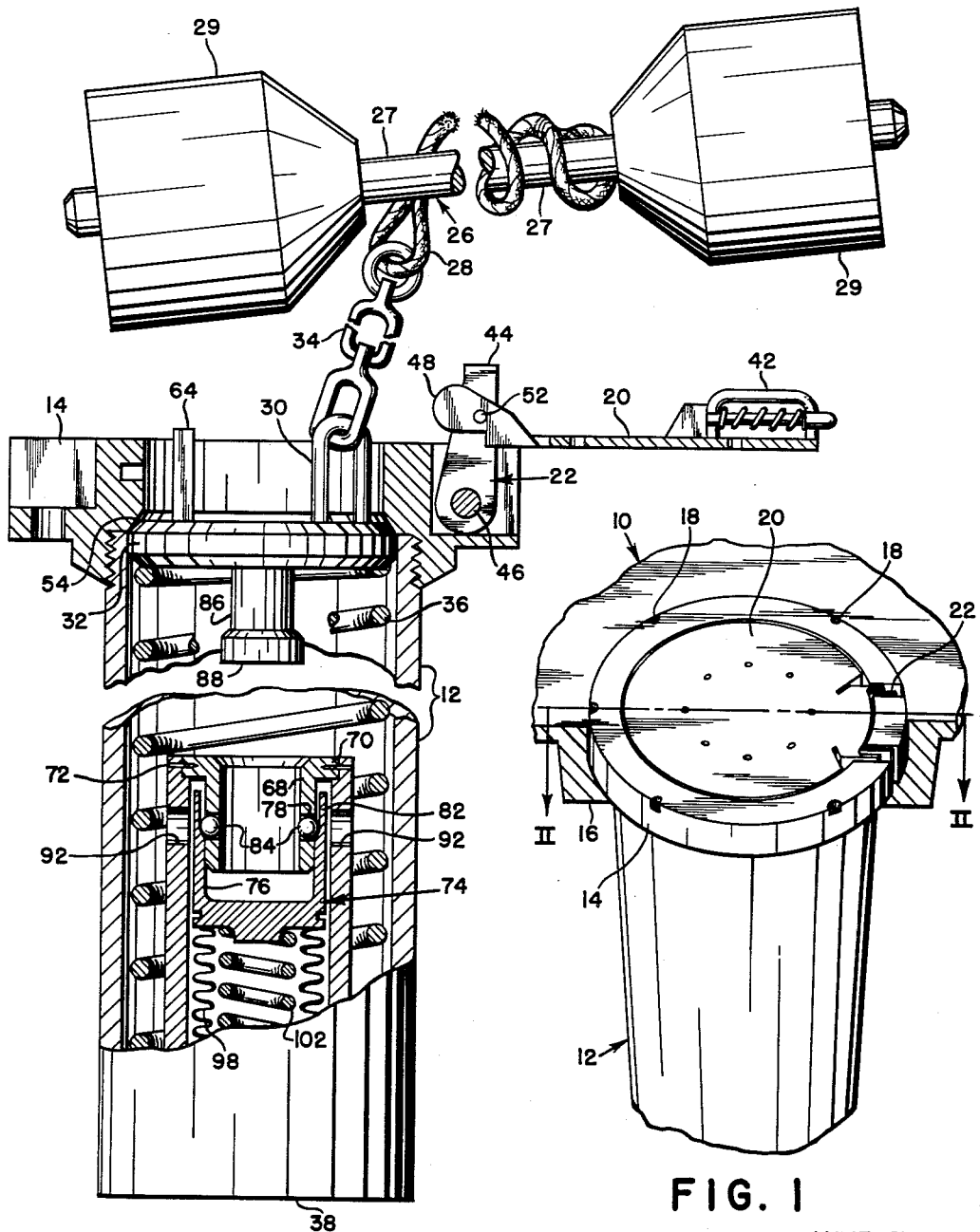
Fig. 1 is a perspective view partially broken away showing the manner in which the present invention is installed within a vessel.
Fig. 3 is a view similar to Fig. 2 showing the retrieving gear in a released position.

In Fig. 1 the outer shell of the vessel in which the retrieving gear is installed is illustrated at 10. The retrieving gear is contained within a tubular casing 12 which is secured to shell 10 by a flange 14 formed at the upper end of casing 12. Shell 10 may be provided with a cooperating flange 16 to receive fastening devices 18 which passes through flange 14 of the retrieving gear. The upper end of tubular casing 12 is closed by a perforate cover 20 hinged at 22. Cover 20 and flange 14 are preferably shaped to form a continuation of shell 10 so that the streamlining of the vessel in which the retrieving gear is located will not be impaired.

Referring now to Fig. 2 the retriever gear is shown in its normal or stored position. In Fig. 2 the outer surface of shell 10 has been schematically shown since the method of fastening the retriever gear to the shell is not considered to be a patentable feature of the present invention. Disposed within tubular casing 12 is a float 26 around which is coiled a line 28. As shown in Fig. 2, float 26 consists of a center rodlike member 27 to which are secured the enlarged, substantially cylindrical end portions 29. Line 28 is secured at one end to shackle 30 of an ejector plate 32 by means of a short length of chain 34. The other end of line 28 is fastened to float 26 as shown in Fig. 2. It is to be understood that the method shown for anchoring line 28 to ejector plate 32 and float 26 is illustrative only and should not be construed as limiting of the present invention.

An ejector spring 36 which is normally disposed in a compressed position between ejector plate 32 and the end plate 38 of tubular casing 12 is provided for expelling float 26 from tubular casing 12 upon the release of a latch hereinafter to be described. Perforate cover 20 is normally held closed against the action of the water and float 26 by a friction catch illustrated at 42. However, friction catch 42 is adapted to release cover 20 when float 26 is moved outwardly under the influence of ejector spring 36. Upon the release of friction catch 42, cover 20 pivots about hinge 22 as shown in Fig. 2B and Fig. 3. As shown in Fig. 2B hinge 22 consists of stub arms 44 pivotally mounted at 46 to flange 14. Lugs 48 depending from cover 20 are pivotally mounted at 52 to stub arms 44. This type of hinge permits cover 20 to open through 180° and lie completely out of the path of float 26 as it is ejected from tubular casing 12. A ridge or projection 54 is provided near the open end of tubular casing 12 to prevent the escape of ejector plate 32 from casing 12. Cylindrical end members 29 serve as guides as the float 26 is being ejected from casing 12. In addition, slots 58 and 62 are provided to the lower cylindrical member 29 to receive shackle 30 and guide pin 64 to further assist in guiding the float 26 as it is expelled from casing 12.

The pressure actuated latch for maintaining ejector plate 32 adjacent the end plate 38 of tubular casing 12 includes an outer sleeve 66 secured at one end to end plate 38 and extending to a point adjacent ejector plate 32. A sleeve 68 is supported in a reentrant position within sleeve 66 by an outwardly extending flange 70. Flange 70 may be secured to outer sleeve 66 by any suitable fastening means herein illustrated as pins 72. Surrounding sleeve 68 is an auxiliary sleeve 74 having a first axially extending portion 76 which normally closely overlies openings 78 in sleeve 68. Auxiliary sleeve 74 is also formed with an axially extending portion of greater internal cross-section illustrated at 82. Loosely disposed within openings 78 are balls 84 which have a diameter greater than the thickness of inner sleeve members 68. Therefore, balls 84 are caused to protrude from the inner surface of sleeve 68 when the portion 76 of auxiliary sleeve 74 overlies openings 78. A stud 86 secured to ejector plate 32 extends within inner sleeve 68 and is formed with a radially extending flange 88 which extends into a holding engagement with protruding balls 84. Openings 92 are also provided in the outer sleeve 66 to facilitate the insertion of balls 84 during the assembly of the latch.

A movable plate 94 is adjustably secured to end plate 38 by means of a screw 96 which may be adjusted from the outer side of end plate 38. Screw 96 is free to rotate within end plate 38 but is held in a fixed axial position by flange 97. A keyway 104 and a cooperating pin 106 are provided in sleeve 66 and plate 94, respectively, to prevent rotation of plate 94. A Sylphon bellows 98 connects plate 94 to auxiliary sleeve 74. A spring 102 is disposed with Sylphon bellows 98 to assist in providing the desired pressure-contraction characteristic of Sylphon bellows 98. Suitable projections are provided on auxiliary sleeve 74 and plate 94 for maintaining spring 102 in position.

The invention operates in the following manner: Assuming that the vessel on which the retrieving gear is located is normally expected to remain above a certain depth, screw 96 is adjusted so that portion 76 of auxiliary sleeve 74 will overlie openings 78 at all pressures less than the pressure corresponding to this preselected depth. If the vessel in which the retrieving gear is located descends to a depth greater than the one selected, the liquid which is allowed to enter through the perforations in cover 20 will exert an increased pressure on Sylphon bellows 98 causing bellows 98 to contract and move auxiliary sleeve 74 toward end plate 38 as shown in Fig. 3. The enlarged portion 82 of auxiliary sleeve 74 will now overlie openings 78. In this position of the auxiliary sleeve 74 balls 84 are permitted to move outwardly to release the holding engagement with flange 88 on stud 86. Ejector spring 36 will then cause ejector plate 32 to move outwardly toward the open end of tubular casing 12 forcing float 26 before it. The outward movement of ejector plate 32 will be limited by the ridge or projection 54 previously described. Once expelled from tubular casing 12 float 26 will rise to the surface unwinding line 28 as it rises. If the depth to which the vessel is expected to submerge is not very great, line 28 may be made strong enough to serve as a hoisting line for the submerged vessel. When it is exjected that the vessel will descend to a considerable depth, space considerations may dictate that a line of smaller diameter be used. In such cases float 26 and line 28 may serve as a guide to the exact location of the submerged object rather than a hoisting line.

While the present invention has been described in terms of a latch which releases upon increasing pressure, it should be obvious that by reversing the portions of larger and smaller cross-section of auxiliary sleeve 74 and by properly locating holes 78, it will be possible to cause the latch to operate in response to a decrease in pressure. Similarly it is possible to modify the present invention to cause auxiliary sleeve 74 to extend within inner sleeve 68 and provide a stud 86 which would surround inner sleeve 68. Also the method of fabricating flange 14, tubular casing 12, end plate 38 and the various parts of the latch are to be considered as illustrative only and in no way limiting the present invention. For example, certain parts shown as integrally formed in the drawings may be made up of individual pieces soldered or welded together. Other pieces shown as separate elements joined together may be machined or cast as a single part if desired. These and other modifications are considered to be obvious from the foregoing detailed description of the invention and therefore lying within the intended scope of the hereinafter appended claims.

The invention described herein may be manufactured and used by or for the Government of the United States of America for governmental purposes without the payment of royalty thereon or therefor.

What is claimed is:

1. A releasable latch comprising a base member, a hollow cylindrical member mounted thereon having at least a first open end, said hollow cylindrical member being formed with a plurality of openings arranged radially about a single point on the axis of said hollow cylindrical member, said openings having a diameter appreciably greater than the wall thickness of said hollow cylindrical member, a sleeve having a first end portion slidably fitted about said hollow cylindrical member and overlying said openings, said sleeve having a second portion of larger internal diameter movable into overlying relationship with said openings upon axial movement of said sleeve relative to said hollow cylindrical member, a movable member having a substantially cylindrical end section slidably fitted within said hollow cylindrical member and a shank member of smaller diameter extending from said end section, said end section being normally disposed between said openings and the second end of said hollow cylindrical member, and a ball disposed in each of said openings, said balls having a diameter appreciably greater than the wall thickness of said hollow cylindrical member, said balls normally precluding movement of said movable member out of contact with said hollow cylindrical member, Sylphon pressure responsive means positioned between said base and said sleeve for imparting axial movement to said sleeve to permit the withdrawal of said balls from the path of said movable member, and adjustment means mounted on said base controlling pressure for initiating said axial movement.

2. A pressure operated releasable latch comprising a first hollow sleeve member formed with a plurality of openings in the side thereof, a base member, means securing said first hollow sleeve member in fixed relationship to said base member, a second sleeve member having a first portion slidably fitted about said first sleeve member and normally overlying said openings, said second sleeve member having a second portion of greater internal diameter than said first portion, a Sylphon bellows positioned between and joining said second sleeve member to said base member, adjustment means for said Sylphon bellows mounted on said base, said Sylphon bellows being adapted to impart a preselected movement to said second sleeve member in response to a preselected change in pressure on said bellows to cause said portion of greater internal diameter to move into overlying relationship with said openings, a ball disposed within each of said openings, said balls having a diameter greater than the wall thickness of said first hollow sleeve member whereby said balls are caused to protrude from the inner surface of said first hollow sleeve member when said first portion of said second sleeve member overlies said openings, a movable member disposed within said first hollow sleeve member, said movable member being formed with a flange extending into holding engagement with said protruding balls thereby preventing relative movement between said movable member and said first sleeve member in at least one axial direction, said balls being movable outwardly to release said holding engagement upon movement of said second portion of said second sleeve into overlying relationship with said openings.

3. A pressure operated releasable latch comprising a first hollow sleeve member having at least a first open end, a base member, means securing said first sleeve member to said base member with the second end of said first sleeve member adjacent said base member, said first sleeve member being formed with a plurality of openings in the side thereof arranged with their centers in a plane transverse to the axis of said first sleeve member, said openings having a diameter appreciably greater than the wall thickness of said first sleeve member, a second sleeve member having a first axially extending portion slidably fitted about said first sleeve member and normally overlying said openings, said second sleeve member having a second axially extending portion of larger internal diameter than said first portion, a Sylphon bellows positioned between and joining said second sleeve member and said base member, adjustment means for said Sylphon bellows mounted on said base member, said Sylphon bellows imparting axial movement to said second sleeve member in response to changes in pressure on said Sylphon bellows thereby to cause said second portion of said second sleeve member to move into overlying relationhip with said openings, a ball disposed within each of said openings, said balls having a diameter appreciably greater than the wall thickness of said first sleeve member, a movable member disposed within said first sleeve member and having a flange extending into holding engagement with said balls, said balls releasing said holding engagement upon movement of said second portion of said second sleeve into overlying relationship with said openings.

4. Retrieving gear for a submerged marine vessel comprising an elongated tubular member disposed within said vessel and having an open end and a closed end, the open end of said tubular member being secured to the outer shell of said vessel in an opening provided therefor, an ejector plate slidably fitted within said tubular member, means secured to said tubular member preventing the escape of said ejector plate through said open end, an ejector spring disposed between said ejector plate and said closed end, a pressure actuated releasable latch normally retaining said ejector plate adjacent said closed end with said ejector spring compressed, said latch comprising a first hollow sleeve member formed with a plurality of openings in the side thereof, means securing said sleeve member to said closed end in coaxial arrangement with said tubular member, a second sleeve member having a first axially extending portion slidably fitted about said first sleeve member and normally overlying said openings, said second sleeve member having a second portion of greater internal diameter than said first portion, a Sylphon bellows joined at one end to said second sleeve member, means coupling the second end of said Sylphon bellows to said closed end, said Sylphon bellows being adapted to move said second sleeve in response to a predetermined change in pressure to cause said portion of greater internal diameter to overlie said openings in said first sleeve member, a ball disposed within each of said openings in said first sleeve member, said balls having a diameter greater than the wall thickness of said first sleeve member whereby said balls are normally caused to protrude from the inner surface of said first sleeve member, and a stud extending from said ejector plate, said stud being formed with a flange extending into holding engagement with said protruding balls, said retrieving gear further comprising a float disposed between said ejector plate and said open end of said tubular member, a line secured to said float and said ejector plate, a perforate cover mounted on the open end of said tubular member holding the float therein, and a second latch mounted on said cover and normally holding the cover in a closed position over the open end of said tubular member and arranged for actuating release thereof upon initial outward movement of said float under the influence of said ejector spring.

5. A retrieving gear as in claim 4 wherein said means securing said Sylphon bellows to said closed end is adjustable from the outer side of said closed end to adjust the pressure at which said latch will release.

6. Retrieving gear for a submerged marine vessel comprising an elongated tubular member disposed within said vessel and having an open end and a closed end, the open end of said tubular member being secured to the outer shell of said vessel in an opening provided therefor, an ejector plate slidably fitted within said tubular member, means secured to said tubular member preventing the escape of said ejector plate through said open end, an ejector spring disposed between said ejector plate and said closed end, a pressure actuated releasable latch normally retaining said ejector plate adjacent said closed end with said ejector spring compressed, said latch comprising a fixed member re-entrant at a first end to form an outer and an inner sleeve, said outer sleeve being secured at a second end of said fixed member to said closed end of said tubular member centrally of said ejector spring, said outer sleeve thereby forming a guide for said compressed ejector spring, said inner sleeve being formed with a plurality of openings in the side thereof, an auxiliary sleeve slidably fitted about said inner sleeve and normally overlying said openings, said auxiliary sleeve being formed with a second portion of greater internal diameter movable into an overlying arrangement with said openings upon axial movement of said auxiliary sleeve, a Sylphon bellows coupled between said closed end of said tubular member and said auxiliary sleeve to provide axial movement of said auxiliary sleeve in response to changes in pressure on said Sylphon bellows, a ball disposed within each of said openings in said inner sleeve, said balls having a diameter greater than the wall thickness of said inner sleeve whereby said balls are normally caused to protrude from the inner surface of said inner sleeve, and a stud extending from said ejector plate, said stud being formed with a flange extending into holding engagement with said protruding balls, said retrieving gear further comprising a float disposed between said ejector plate and said open end of said tubular member, a line secured to said float and to said ejector plate, a perforate cover mounted on the open end of said tubular member holding the float therein, and a second latch mounted on said cover and normally holding the cover in a closed position over the open end of said tubular member and arranged for actuating release thereof upon initial outward movement of said float under the influence of said ejector spring.

References Cited in the file of this patent
UNITED STATES PATENTS

| | | |
|---|---|---|
| 1,692,826 | Ganz | Nov. 27, 1928 |
| 2,139,193 | Lamothe et al. | Dec. 6, 1938 |
| 2,365,445 | Badowski | Dec. 19, 1944 |
| 2,415,863 | Bell et al. | Feb. 18, 1947 |
| 2,559,918 | Grieb | July 10, 1951 |
| 2,569,977 | Dickinson | Oct. 2, 1951 |
| 2,586,847 | Mead | Feb. 26, 1952 |